April 12, 1938.  H. ROSENBERG  2,114,115
DAMPER CONTROL DEVICE
Original Filed Dec. 7, 1935
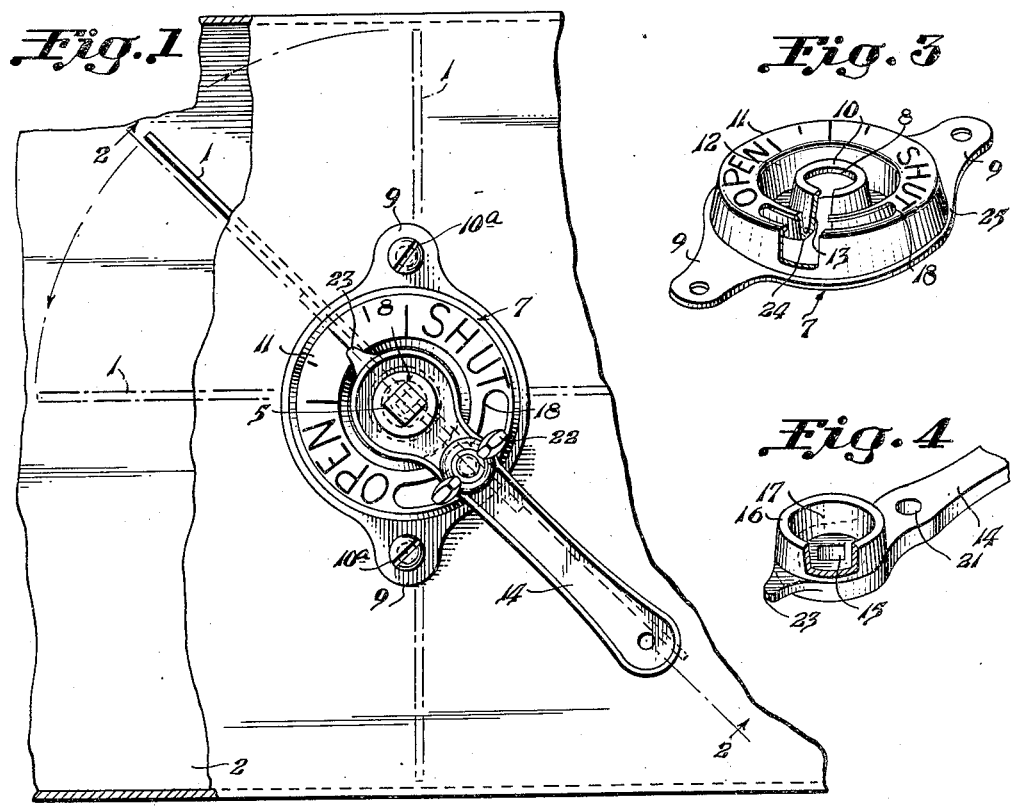
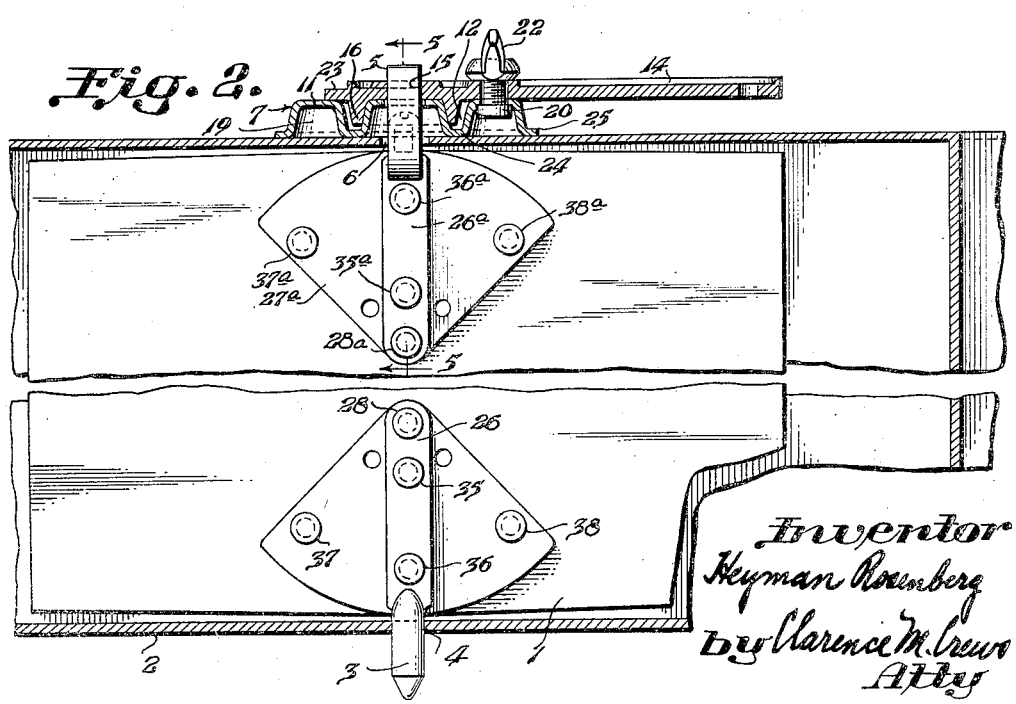
Inventor
Heyman Rosenberg
by Clarence M. Crews
Atty Patented Apr. 12, 1938

2,114,115

UNITED STATES PATENT OFFICE 2,114,115

DAMPER CONTROL DEVICE

Heyman Rosenberg, New York, N. Y.

Original application December 7, 1935, Serial No. 53,305. Divided and this application May 27, 1936, Serial No. 82,043

2 Claims. (Cl. 126—295)

This invention relates to dampers for the control of air or other gaseous fluid, either hot or cold, in ducts, and more particularly to dampers of the dial type as disclosed in Letters Patent of the United States No. 1,324,620 granted to me on December 9, 1919. The present invention is in the nature of an improvement upon the invention disclosed in said patent.

The present application is a division of my pending application Serial No. 53,305, filed December 7, 1935, for Damper control dial, which has now matured into Patent No. 2,081,307, granted May 25, 1937.

In accordance with the disclosure of the patent referred to, provision is made of a damper blade having a non-circular stem or bearing attached to it and protruding through a side of the duct in which the damper is mounted. The non-circular stem extends through circular openings in the duct wall and in a dial attached to the outer face of the duct wall, and carries upon its outer end a handle whereby the damper can be turned. Provision is made of means for securing the handle in different adjusted positions as desired. Since the square stem cannot fit the round openings through which it passes, leakage of air occurs past the stem in the patented structure. The non-circular stem, moreover, forms an imperfect bearing and has some freedom of play in the round openings, so that binding is apt to occur when re-adjustment of the damper setting is undertaken.

It is an object of the present invention to overcome disadvantages and drawbacks of this prior construction.

To this end it is a feature of the present invention that the dial plate is formed with a central, frusto-conical boss surrounded by an annular channel, and that the handle is provided on its lower face with an annular flange having an inner frusto-conical surface adapted to seat against and have sealing engagement with the frusto-conical surface of the central boss of the dial plate. The cooperating conical surfaces thus provided serve both to seal the structure against leakage of air past the damper stem, and also to provide cooperating bearing surfaces for supporting the handle. The bearing surfaces are of relatively large diameter and are of substantial longitudinal extent so that the handle and the damper are held steady and liability of binding is obviated.

Other objects and advantages will hereinafter appear.

In the drawing forming part of this specification,

Fig. 1 is a fragmentary plan view showing a portion of a duct with a damper embodying features of the invention applied thereto;

Fig. 2 is a fragmentary view in sectional elevation taken upon the line 2—2 of Fig. 1, looking in the direction of the arrows;

Fig. 3 is a perspective view of the damper dial partly broken away; and

Fig. 4 is a fragmentary, inverted perspective view, partly broken away, of the damper handle.

In Figs. 1 and 2 a damper 1 is shown mounted in a duct 2 so as to have its axis extend through the middle portion of the damper. The damper has attached to it a cylindrical bearing 3 which snugly fits a circular opening 4 formed in a wall of the duct 2. The damper also has secured to it a square stem 5 which extends through a circular opening 6 in the opposite side of the duct and which is disposed in axial alignment with the bearing 3.

A dial plate 7 is secured upon the outer side of the duct, the dial plate being provided with a central opening 8 in alignment with the openings 4 and 6. The dial plate 7 is provided with ears 9 for attachment to the duct, and attachment may be effected by the insertion of hardened "sheet metal" screws 10a through the ears 9 and the duct wall. The dial as viewed from above comprises a central boss 10 and an outer circular boss 11 with an intervening annular channel 12 between them. The lateral wall 13 of the central circular boss is a sloping wall, being desirably frusto-conical in form and providing a conical sealing and bearing surface for cooperation with a damper handle 14. The damper handle 14 is provided with a square opening 15 which has a snug sliding fit with the square damper stem 5.

The handle 14 is provided at its lower side around the opening 15 with an annular flange 16. The inner wall 17 of the flange 16 is sloped, being desirably frusto-conical in form, and being shaped to bear against the sloping surface 13 of the boss 10 and to fit such surface snugly. The cooperation of the engaged walls of the flange 16 and the boss 10 serves both to seal the structure against the flowing of air past the stem 5 and also to provide a steady bearing support for the handle 14 so that there is no tendency whatever for the handle to bind when the damper is being adjusted. These advantages constitute important features of the present invention.

The outer circular boss 11 of the dial plate has an arcuate slot 18 provided through a portion of the top thereof, the slot letting into an annular channel 19 formed at the lower side of the dial plate. A square headed bolt 20 is disposed with its head lying in and filling the width of the channel 19 and with its shank extending upward through the slot 18 and through an opening 21 in the handle 14. A wing nut 22 is threaded upon the upper end of the bolt 20 and may be turned either to clamp the handle 14 in an adjusted position or to unclamp the handle so as to permit adjustment thereof. Rotation of the bolt is prevented by engagement of the sides of its head with the walls of the channel 19. The handle is provided with a pointer 23 which cooperates with scale or graduation marks formed on a portion of the upper face of the boss 11. The upper face of the boss 11 may also be provided with the legends "Open" and "Shut" to guide the attendant in setting the damper.

Tightening of the nut 22 serves both to lock the handle against rotation in any desired position of adjustment and to press the flange 16 downward into firm engagement with the sloping wall 13 of the boss 10. The flange 16 automatically finds a position concentric with the boss 10 as it is pressed downward, the interaction between the flange and the boss being a camming action.

The base 24 of the channel 12 is disposed in the plane of the rim 25 of the dial plate or, in other words, in a position to be pressed firmly against the outer face of the duct 2 when the dial plate is secured in place. The central space within the circular boss 10 is thus sealed against escape of air between the dial plate and the outer face of the duct. The bearing plate is desirably a sheet metal stamping.

As seen in Figs. 1 and 2 the axis of the damper extends across the middle of the damper blade and across the middle of the duct. The bearing 3 and the bearing stem 5 are provided with attaching finger plates 26 and 26a respectively, the former being attached to the damper by rivets 35 and 36, the latter being attached to the damper by rivets 35a and 36a. Reinforcing bearing plates 27 and 27a are employed in effecting this connection, but since they form no part of the present invention and are claimed in the parent application referred to above, there is no reason for describing them in detail in the present application. In the illustrative embodiment, the finger plate 26 is secured to the bearing plate 27 by a rivet 28, and the rivets 35 and 36 pass through the bearing plate as well as through the damper blade and the finger plate 26. Similarly the finger plate 26a is secured to the bearing plate 27a by means of a rivet 28a, and the rivets 35a and 36a pass through the bearing plate 27a as well as through the finger plate 26a, and the damper blade. The bearing plate 27 is additionally secured to the damper blade by rivets 37 and 38, while the bearing plate 27a is additionally secured to the damper blade by rivets 37a and 38a.

While I have illustrated and described in detail certain preferred forms of my invention, it is to be understood that changes may be made therein and the invention embodied in other structures. I do not, therefore, desire to limit myself to the specific constructions illustrated, but intend to cover my invention broadly in whatever form its principle may be utilized.

I claim:

1. In a damper structure for controlling the flow of fluid in a duct, in combination, a non-circular damper stem disposed to extend outward through an opening in the duct wall, a plate attached to the duct wall and having a central opening for accommodating the damper stem, said plate having a centrally disposed outwardly facing bearing and sealing boss surrounding the central opening, the boss having a sloping circumferential surface and a handle slidingly fitted on the non-circular end portion of the damper stem, said handle having an annular bearing flange surrounding the boss for coacting with the sloping surface of the boss to provide a steady support for the stem and handle, and adjustable means cooperative with the handle and the plate for preventing separation of the handle from the plate and for locking the handle in different adjusted positions.

2. In a damper structure for controlling the flow of fluid in a duct, in combination, a damper blade having a non-circular stem adapted to extend outward through a wall of the duct, a plate secured upon the duct wall and surrounding said stem, a handle slidably fitted on the stem at the outer side of said plate, said plate having successively at its side which faces toward the duct, a circular sealing surface for engaging the outer face of the duct wall and a circular channel, and at its side which faces away from the duct, a sloping bearing surface and a circular boss, said handle having at its side which faces toward the plate, an annular flange having a bearing surface cooperative with the sloping bearing surface of the plate to provide a steady bearing for the damper and to seal the structure against air leakage past the stem, clamping means for clamping the handle to the plate in different rotative positions comprising a threaded member disposed in the channel at the inner side of the plate and held against rotation by engagement with the walls of the channel, and means, more remote from the center of the plate than said channel, for attaching the plate to the duct.

HEYMAN ROSENBERG.